UNITED STATES PATENT OFFICE.

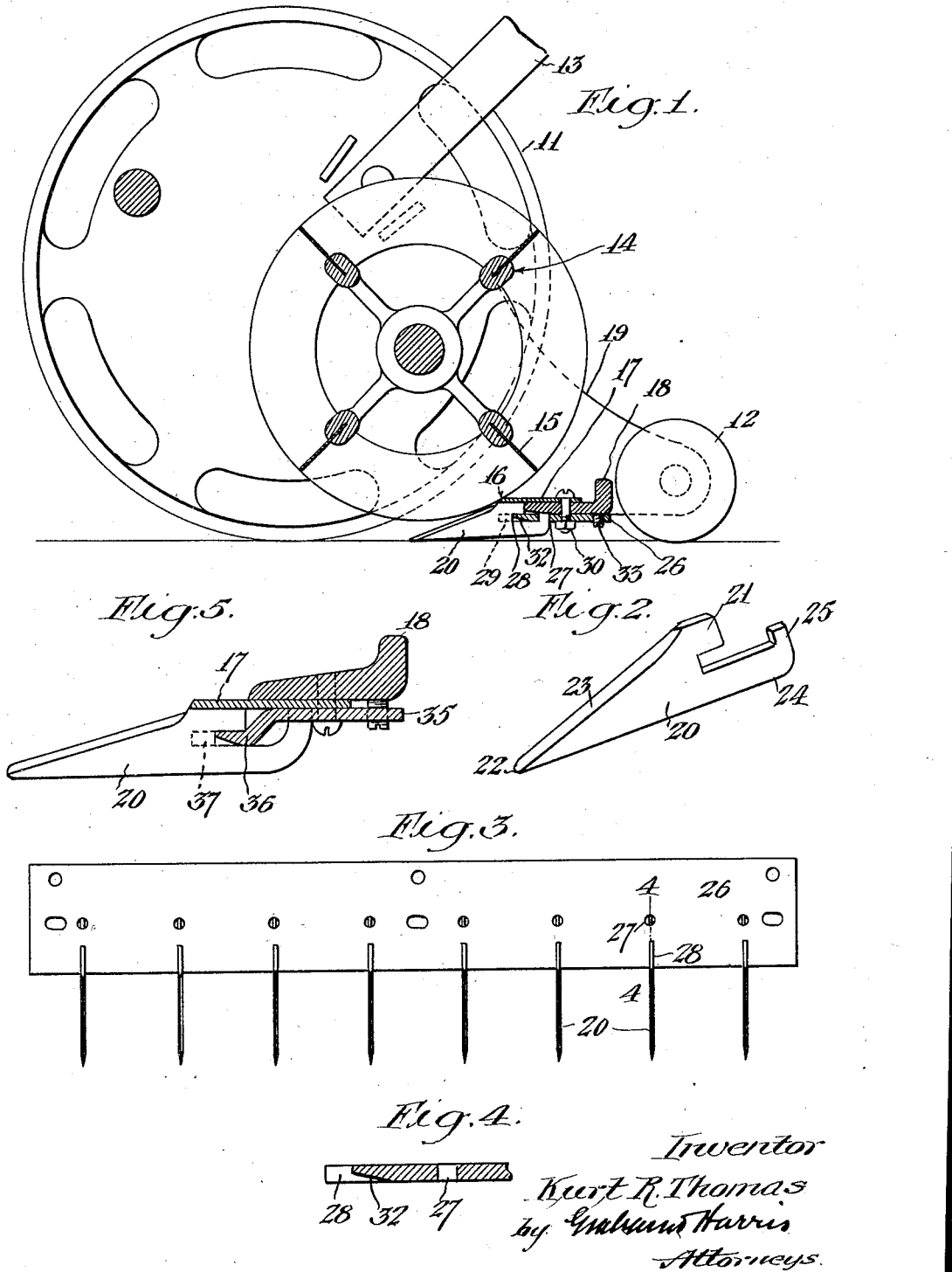

KURT R. THOMAS, OF LOS ANGELES, CALIFORNIA.

BERMUDA-GRASS CUTTER.

1,407,962.    Specification of Letters Patent.    Patented Feb. 28, 1922.

Application filed February 7, 1921. Serial No. 443,027.

*To all whom it may concern:*

Be it known that I, KURT R. THOMAS, a citizen of the United States, residing at Los Angeles, county of Los Angeles, and State of California, have invented a new and useful Bermuda-Grass Cutter, of which the following is a specification.

My invention relates to grass cutters, being more particularly a cutter of the rotary type known as a lawn mower.

Lawn mowers of the type referred to usually are provided with a flat plate which coacts with a series of spiral blades of the rotary type for the purpose of cutting the grass.

Bermuda grass, or grass of similar nature, has a great number of runners which grow along the surface of the ground taking root into the ground in various places, such runners lying ordinarily so close to the ground that the ordinary mower fails to operate upon the runner.

I am aware that various types of forks and lifting fingers have been provided for lawn mowers for the purpose of lifting the runners into the path of the cutters, but such devices are ineffective for the reason that the cutters pass over the runners without severing the same.

The principal object of my invention is to provide a lawn mower of the common type with a series of forwardly projecting cutting blades which extend under the runners and cut the same during the mowing operation.

Other objects and advantages will appear from the following specification and drawing.

Referring to the drawings which are for illustrative purposes only,

Fig. 1 is a vertical sectional view of a lawn mower equipped with a device embodying my invention.

Fig. 2 is a perspective view of one of the cutting blades.

Fig. 3 is a plan view of the clamping plate showing the blades in position.

Fig. 4 is an enlarged sectional view on line 4—4, Fig. 3, and

Fig. 5 is a cross-sectional view of a modified form of the device.

The lawn mower, generally indicated in Fig. 1, is provided with the usual side wheels, 11, rear roller, 12, handle, 13, and the rotary cutter, 14, the blades 15 of such rotary cutter engaging during their rotation the sheering edge 16 of a cutter plate 17, such cutter plate being mounted upon a cutter bar 18, secured to the side frames 19 of the mower.

In the form shown in Figs. 1 to 4 inclusive, the cutter blades or knives are mounted under the cutter plate 17, each of these blades indicated at 20 consisting of a head 21 extending forwardly into a point 22, the upper edge of the blade being formed into a knife edge indicated at 23. The lower portion of the head extends rearwardly upon a shank 24 having an upturned lug 25.

26 designates a clamping plate for the cutter blades, being provided with a series of holes 27 and corresponding slots 28 in the edge of the plate in front of each hole. The blades 20 are mounted upon the clamping plate 26 in the position shown in Figs. 1 and 3, the head 21 extending over the top of the clamping plate and engaging under the cutter plate 17. A portion of the blade extends into the slot 28, as indicated at 29, the shank 24 engaging under the clamping plate 26 and the lug 25 extending upwardly into the hole 27. When each plate is so mounted upon the clamping plate, the clamping plate is secured to the underside of the cutter bar 18 by means of a bolt indicated at 30, the bolt clamping the plate 26 to the underside of the cutter bar thereby clamping the head of each blade between the cutter plate 17 and the clamping plate 26. The underside of the clamping plate 26 back of each slot 28 is cut away, as indicated at 32, for the purpose of permitting the blade to swing during the operation of inserting the lug 25 in the hole 27.

33 designates a set screw mounted in the clamp plate 26, there being several of such screws by means of which the angle of the clamping plate 26 may be varied and the angle of the cutter blades correspondingly adjusted.

In the form shown in Fig. 5, the cutter plate 17 is mounted on the underside of the cutter bar 18, the cutter blades 20 being of the same general construction as that heretofore described and correspondingly mounted upon a clamping plate 35. The clamping plate, however, in this form, engages the cutter plate 17, as shown in Fig. 5, such clamping plate having an offset portion indicated at 36 slotted at its forward edge, as indicated at 37, to receive the blades 20.

The device operates in the following manner:

As the mower is pushed forwardly, the points of the blades 20 travel just above the surface of the ground and extend under the runners of the Bermuda grass. As the mower is moved forwardly, such runners are raised and during such movement are drawn over the knife edge 23 of the blades thereby severing the runners.

I have found that by cutting Bermuda grass in this manner, the length of the runners is limited and that a spreading of such grass is eliminated, the ends of the runners cut by the blades 20 when partially raised, as above described are readily cut by the mower proper, that is, the rotary cutter 14 and the cutter plates 17, this is due to the fact that Bermuda grass packs and when the runners are cut, the mass is free to be cut by the rotary cutter.

I claim as my invention:

1. In a grass cutter, a cutter bar, a cutter plate mounted on said bar, a rotary cutter, a series of forwardly extending knives, a clamping plate engaging said knives and means for securing said clamping plate to said bar.

2. In a grass cutter, a cutter bar, a cutter plate mounted on said bar, a series of forwardly extending stationary knives, a head on each knife, a clamping plate engaging the heads on said knives, and means for securing said clamping plate to said bar.

3. In a grass cutter, a cutter bar, a cutter plate mounted on said bar, a series of forwardly extending stationary knives, a head on each knife, a lug on each knife, a clamping plate engaging the heads on said knives and having a series of holes formed therein arranged to receive the lugs on said knives, and means for securing said clamping plate to said bar.

4. In a grass cutter, a cutter bar, a cutter plate mounted on said cutter bar, a series of forwardly extending knives having a cutting edge on their upper surface, a lug on each knife, a clamping plate having a series of slots arranged to receive said knives and having a series of holes formed therein to receive the lugs on said knives, bolts for securing said clamping plate to said bar, and a plurality of set screws in said clamping plate arranged to engage said bar.

5. In a grass cutter, a cutter bar, a cutter plate mounted on said bar, a rotary cutter coacting with said plate, and a series of forwardly extending pointed knives mounted on said bar having their upper edge forming a knife edge.

In testimony whereof, I have hereunto set my hand at Los Angeles, California, this 29th day of January, 1921.

KURT R. THOMAS.